US006653810B2

(12) United States Patent
Lo

(10) Patent No.: US 6,653,810 B2
(45) Date of Patent: Nov. 25, 2003

(54) MOTOR CONTROL SYSTEM

(75) Inventor: Clement C. Lo, Lake Oswego, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/759,741

(22) Filed: Jan. 12, 2001

(65) Prior Publication Data

US 2002/0093303 A1 Jul. 18, 2002

(51) Int. Cl.[7] .............................................. G05B 19/18
(52) U.S. Cl. ........................ 318/569; 318/34; 318/111; 318/112; 318/113
(58) Field of Search ................................. 318/254, 138, 318/439, 34, 112, 569, 113; 700/19; 710/2.3

(56) References Cited

U.S. PATENT DOCUMENTS

| 4,254,473 A | * | 3/1981 | Galdun et al. ................. 700/79 |
| 4,639,645 A | * | 1/1987 | Hartwig ........................ 318/51 |
| 4,809,217 A | * | 2/1989 | Floro et al. ..................... 710/52 |
| 4,853,602 A | * | 8/1989 | Hommes et al. ............... 310/12 |
| 4,997,053 A | * | 3/1991 | Drori et al. ................... 180/287 |
| 5,130,710 A | * | 7/1992 | Salazar .......................... 341/11 |
| 5,237,250 A | * | 8/1993 | Zeile et al. .................... 318/34 |
| 5,473,758 A | * | 12/1995 | Allen et al. ................... 711/103 |
| 5,483,458 A | * | 1/1996 | Lee et al. ..................... 318/625 |
| 5,610,491 A | * | 3/1997 | Gotz et al. .................... 318/572 |
| 5,758,073 A | * | 5/1998 | Liang et al. .................. 709/230 |
| 5,869,939 A | | 2/1999 | Lander ......................... 318/439 |
| 5,955,853 A | * | 9/1999 | Lander ......................... 318/138 |
| 6,054,787 A | | 4/2000 | Chiu ............................ 310/51 |
| 6,281,645 B1 | * | 8/2001 | Matsukawa .................. 318/111 |

OTHER PUBLICATIONS

Clement C. Lo, "Plotter Servo Electronics Contained on a Single IC," HP Journal Oct. 1981, pp. 8–9.

* cited by examiner

Primary Examiner—Rita Leykin

(57) ABSTRACT

A motor controller circuit for controlling an electric motor in response to motor commands from a host controller. The controller circuit includes a motor driver circuit for providing motor driver signals to the motor in response to motor driver commands. A control logic circuit is responsive to command words from the host controller for generating motor drive control signals, the controller has an associated motor identification, each command word having associated therewith a motor identification portion and a motor command portion. The control logic compares the motor identification portion of the command word to the motor identification, and converting the motor command portion into motor driver control signals if the motor identification portion corresponds to the motor identification. Multiple motors can be interfaced to a host controller, either in parallel or in a cascaded manner. Each motor has an unique address, and can interpret a command word and execute a command addressed to the motor. Each motor can also report its status and completion of a command.

30 Claims, 7 Drawing Sheets

MOTOR CONTROL SYSTEM

TECHNICAL FIELD OF THE INVENTION

This invention relates to the interface and control of electric motors.

BACKGROUND OF THE INVENTION

DC motors are small, low cost and efficient, and are popular for use in open loop control environments. On the other hand, stepper motors are simpler to control, but at much higher cost. If precision control of speed and/or position is desired, more expensive closed-loop servo control systems are used, and typically require position sensor and control electronics. Optical or magnetic encoders are commonly used to provide motion and speed information to the motor control circuitry.

In order to reduce cost, U.S. Pat. No. 5,869,939 describes a DC motor with an unbalanced winding and the control system to detect the difference in current through each winding to detect rotation. This detected signal is used to control the motion and position of the motor. U.S. Pat. No. 6,054,787 also describes an electric motor with a reduced number of windings on one of the coil windings.

Each of these servo control systems interfaces separately to the host controller, and requires a share of system overhead. If one servo control takes up X inputs to the host controller, typically an ASIC, adding a second servo will usually require X additional inputs to the ASIC.

An unbalanced winding motor and control system offers the opportunity for lower cost motion control design, however it did not resolve the design challenge and cost of interfacing and controlling multiple motors in a given application.

SUMMARY OF THE INVENTION

This invention relates to the interface and control of motors. It allows system designers to add motion or position control in a low cost and logical manner without proportionally adding system overhead. This interface approach will benefit any motor control system, such as DC or stepper motors; however its advantages may be more significant with the unbalanced winding DC motor due to its low cost.

Traditional designs require a unique interface (dedicated interface port) for each servo channel, as well as system bandwidth to monitor the progress of the motor in motion. This invention enables multiple motors to interface to the host, either in parallel or in a cascaded manner. Each motor has an unique identification (ID) or address, and can interpret and execute a command word addressed to the motor. Each motor can also report its status and completion of a command. This greatly simplifies system overhead.

BRIEF DESCRIPTION OF THE DRAWINGS

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENTS

Figure 1A:
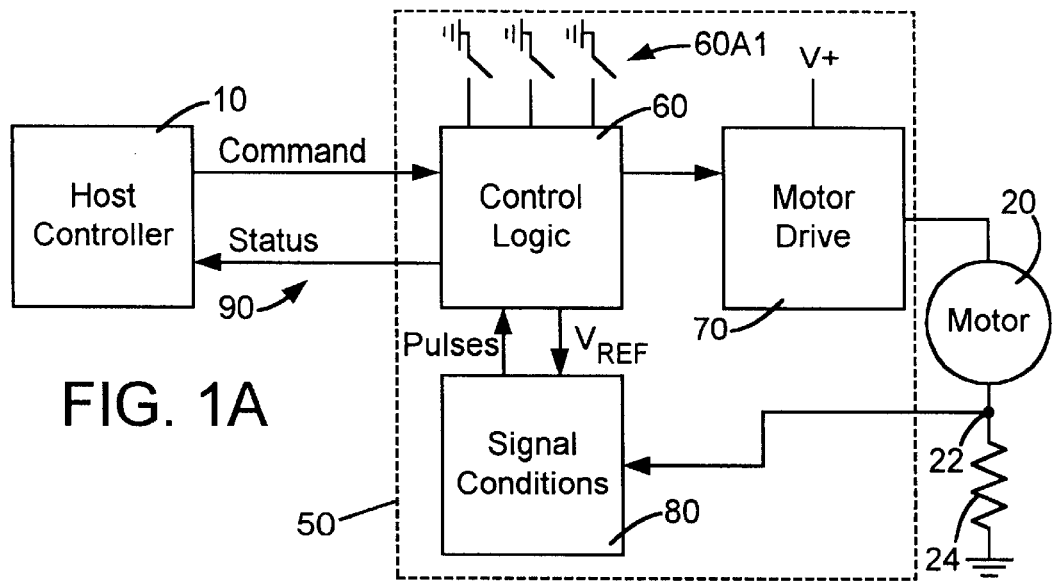
FIG. 1A is a schematic block diagram of a motor controller in accordance with an aspect of the invention.

An exemplary embodiment of the invention is illustrated in the schematic block diagram of FIG. 1A. A host controller 10 provides motor commands and receives status data from a motor 20 through a motor controller 50. The controller includes a control logic 60, a motor driver 70 and signal conditioning circuitry 80. The control logic 60 receives the motor commands from the host controller, and converts these to motor driver signals for controlling the motor driver 70.

A preferred implementation of the invention is to integrate the control logic 60, motor driver 70 and signal conditioning circuitry 80 on a single integrated circuit chip, e.g. using Bi-CMOS technology, or as a hybrid circuit, e.g., a CMOS circuit for implementing the logic and processor functions and a bipolar circuit for implementing the motor driver functions. In an exemplary implementation, the control logic implementation includes some form of microprocessor.

In a preferred embodiment, the motor 20 is a DC motor with an unbalanced winding. Exemplary motors suitable for this application include those described in U.S. Pat. Nos. 5,869,939 and 6,054,787.

Figure 1C:
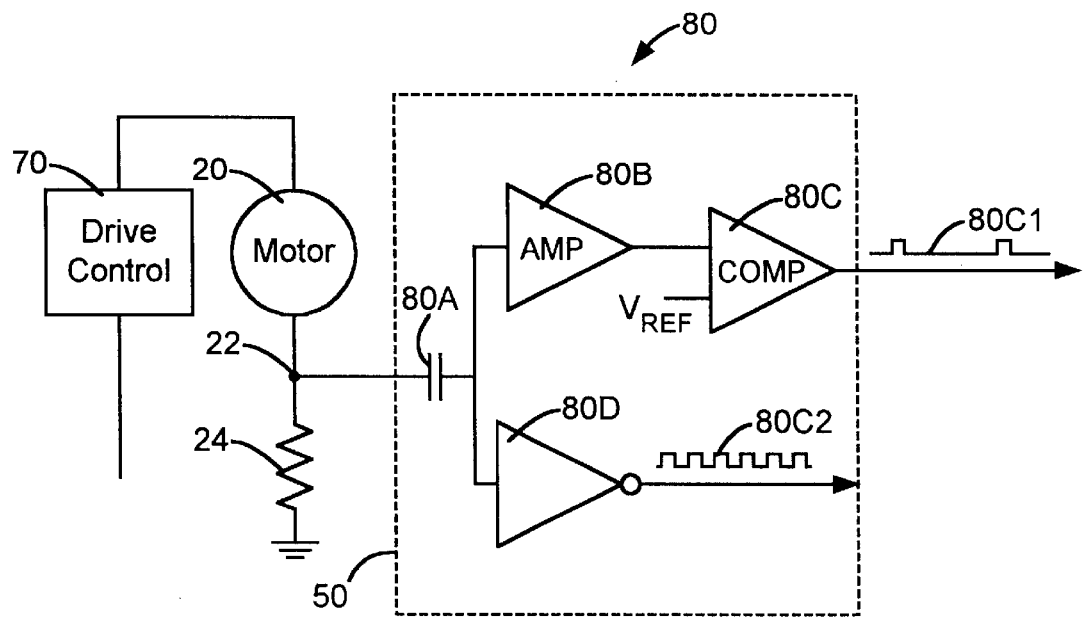
FIG. 1C is a schematic diagram of an exemplary signal conditioning circuit comprising the motor controller of FIG. 1A.

The signal-conditioning circuitry 80 is responsive to a current-sensing resistor 24 connected between one motor terminal and ground, and filters out undesired motor noise. This filtered signal is processed to generate an index pulse for each revolution of the motor rotor or shaft. FIG. 1C illustrates an exemplary circuit for performing the functions of circuitry 80. As shown therein, the circuit 80 includes a filter capacitor 80A which is connected to node 22, to sense the voltage on current sensing resistor 24 which is connected between node 22 and ground. The capacitor 80A provides AC coupling of signals at the node 22 to the sense amplifier circuit 80B. The output of the amplifier 80B is connected to one input of comparator 80C, which compares the amplified voltage to a reference voltage provided by the control logic 60. The output of the comparator is a pulse train, wherein each pulse is generated by the rotor carrying the unbalanced motor winding passing the motor commutator. A signal 80C1 from comparator 80C is caused by the imbalanced winding. The AC component of the voltage at node 22 is also connected to an invertor 80D, to provide a pulse train representing an index pulse 80C2 for each rotor. The pulses 80C2 can be used to provide increased resolution for the motor shaft position indicated by the index pulse 80C1.

Figure 1B:
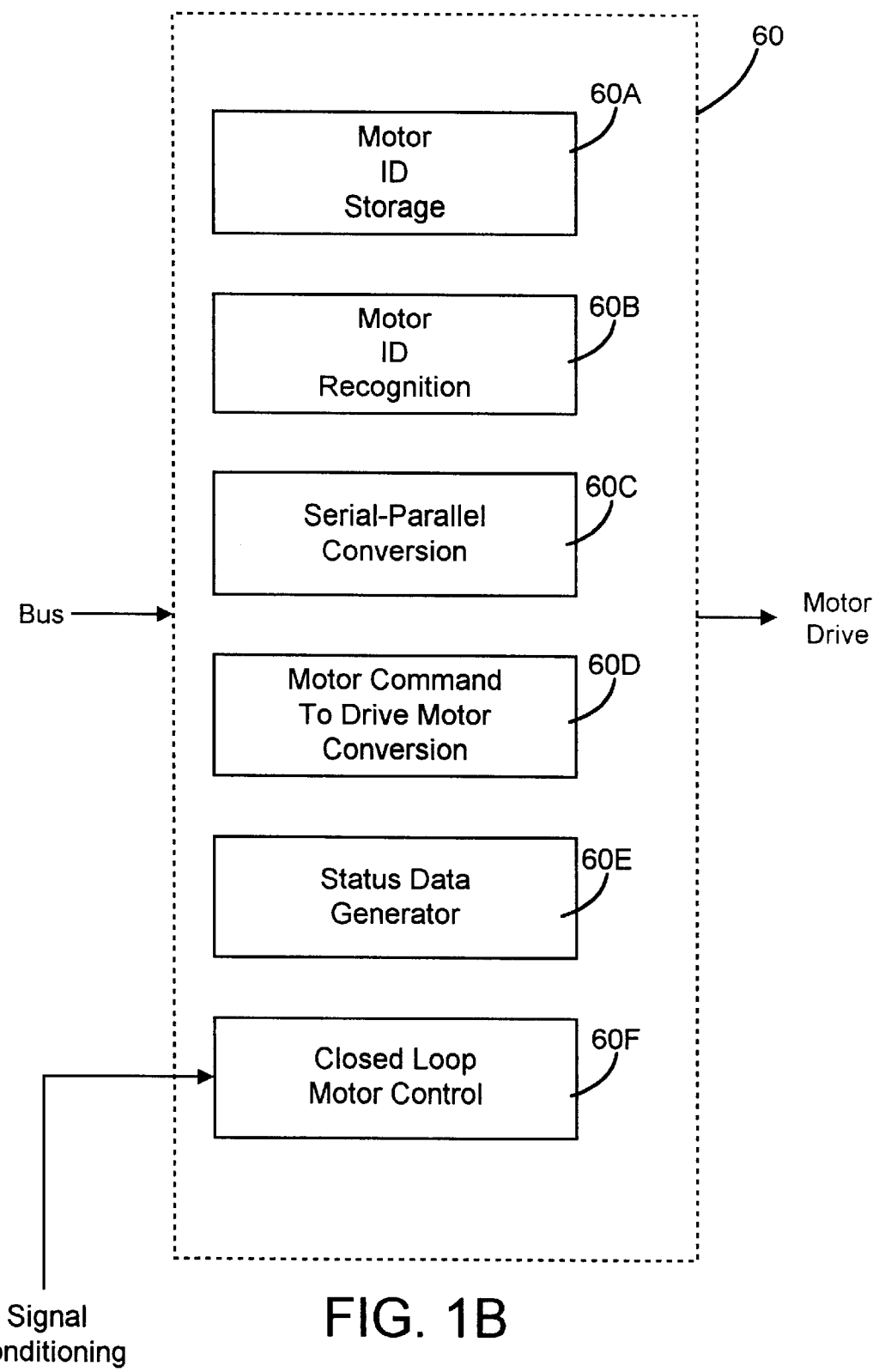
FIG. 1B is a functional block diagram of the control logic of the motor controller of FIG. 1A.
Figure 1D:
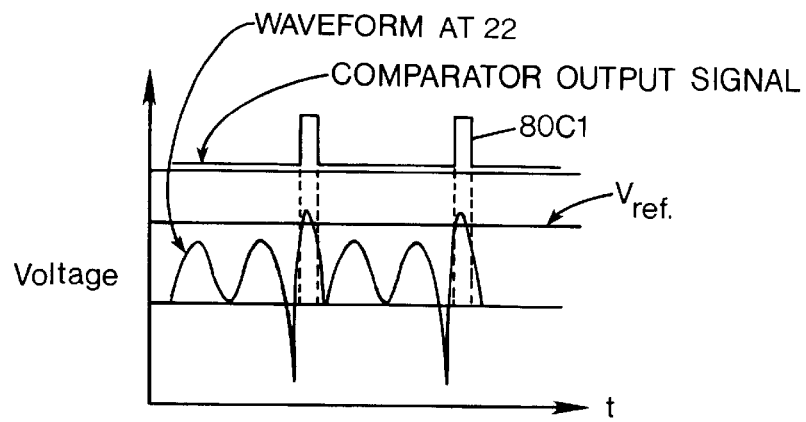
FIG. 1D is a graph showing exemplary voltage waveforms and illustrating how the circuit of FIG. 1C provides motor index pulses.

FIG. 1D is a graph illustrating an exemplary voltage waveform at node 22 generated by the unbalanced motor 20. The motor 20 in this case has three rotors each carrying a motor winding, with one winding having fewer turns than the other windings. Waveform 22A is the voltage on the motor current sensing resistor 24; the effect of the unbalanced winding is evidence in the waveform. The reference voltage $V_{REF}$ is set above the magnitude of the pulses generated by the windings having equal numbers of turns. The comparator compares the reference voltage to the voltage on capacitor 80A, and thus generates a pulse train 80C1 representing the occurrence of voltage of magnitude greater than $V_{REF}$.

The control logic 60 performs a number of functions, which are generally indicated in the functional block diagram of FIG. 1B. These functions include a motor identification storage, which can be in the form of a unique motor address for the motor under control. This storage can take the form of a set 60A1 of switches or fusible links, whose settings or states define a binary code representing the motor address, in the same manner as remote control garage door opener codes are set. Alternatively, the motor address storage 60A can be provided by nonvolatile memory.

The control logic 60 further includes logic for recognizing the motor address on commands received on the bus 90. The control logic 60 includes some form of serial to parallel conversion logic, for converting the serial data received on the serial bus 90 into a parallel data format used by the control logic 60. The control logic 60 can be implemented using random logic, an embedded microcontroller, or other known techniques. Circuits and processing functions for accomplishing this task are well known in the art.

The control logic 60 also includes a conversion function to convert the motor command received from the host for the motor under control into a motor driver command signal. In an exemplary embodiment, the motor driver command signal is a pulse width modulation signal, which controls the drive on the motor. Circuitry or processing function for accomplishing this task are also well known in the art. The motor driver command signal is passed to the motor driver 70 to generate the motor drive signals which drive the motor 20.

The control logic 60 also includes a status data generator to generator a status signal indicative of the status of motor 20. This function is illustrated in FIG. 1B as status generator function 60E. This function is responsive to the closed loop motor control function 60F, which receives the outputs of the signal conditioning circuit 80, so that the motor speed and position information can be monitored, using the index pulses 80C1, 80C2 derived from the output of the signal conditioning circuit. The closed loop motor control function 60F is responsive to the control commands received via the bus 90, and to the pulses received from the signal conditioning circuitry 80 to control the motor 20 according to the motor commands. U.S. Pat. No. 5,869,939, the entire contents of which are incorporated herein by this reference, describes an exemplary closed loop control system with feedback control, which can be employed for this purpose. The signals from the signal conditioning circuitry 80 are employed as the motor shaft position indicating signals. The closed loop motor control function 60F includes a feedback circuit configured in an exemplary application to generate an actual position signal representative of the actual position of the shaft of the DC motor 20, which is derived from the signal conditioning circuitry signals. The function 60F is further configured to generate a motor position error signal representative of any difference between the motor commanded position and the actual position signal. The motor drive 70 couples a direct current voltage to the motor 20. The motor position error signal is used to control the motor drive 70 to rotate the motor shaft to correct for any error in the desired position of the motor shaft.

The host controller 10 in this exemplary embodiment sends a command word in serial form over the serial bus 90 to the motor controller 50. The command word can include, by way of example, a motor address identifying the particular motor to which the command word is addressed, rotation speed, number of revolutions or angle of rotation, direction of rotation, acceleration rate, and pulse width modulation (PWM) value. Using the same serial bus 90, the host controller 10 can also read back the status of the motor (e.g., standby, busy, finish, or error), by reading a status data word generated by the status data generator 60E.

Figure 1E:
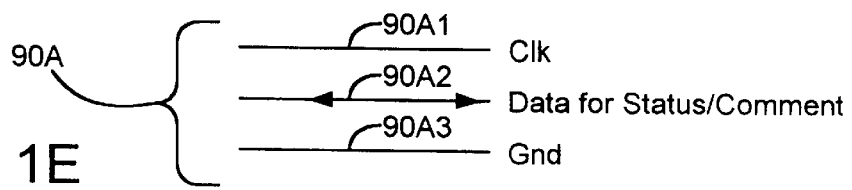
FIGS. 1E–1G illustrate three embodiments of a bus used in the system of FIG. 1A.
Figure 1F:
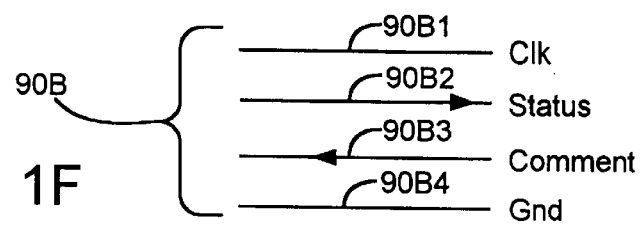
Figure 1G:
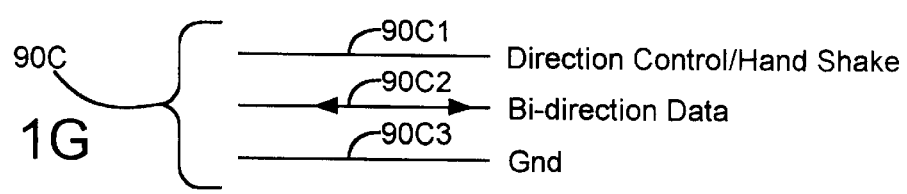

The bus 90 can be implemented in various ways. For example, FIG. 1E illustrates a three wire bus 90A, for synchronous communication, where wire 90A1 carries a clock signal, wire 90A2 carries data for status/command functions, and wire 90A3 is a ground line. FIG. 1F illustrates a four wire bus 90B, for synchronous communication, where wire 90B1 carries a clock signal, wire 90B2 carries status data, wire 90B3 carries command data, and wire 90B4 is a ground. FIG. 1G shows an asynchronous form of data bus, where wire 90C1 is a direction-control/handshake line, line 90C2 is a bi-directional data line for carrying command or status information, and line 90C3 is a ground line.

Figure 2:
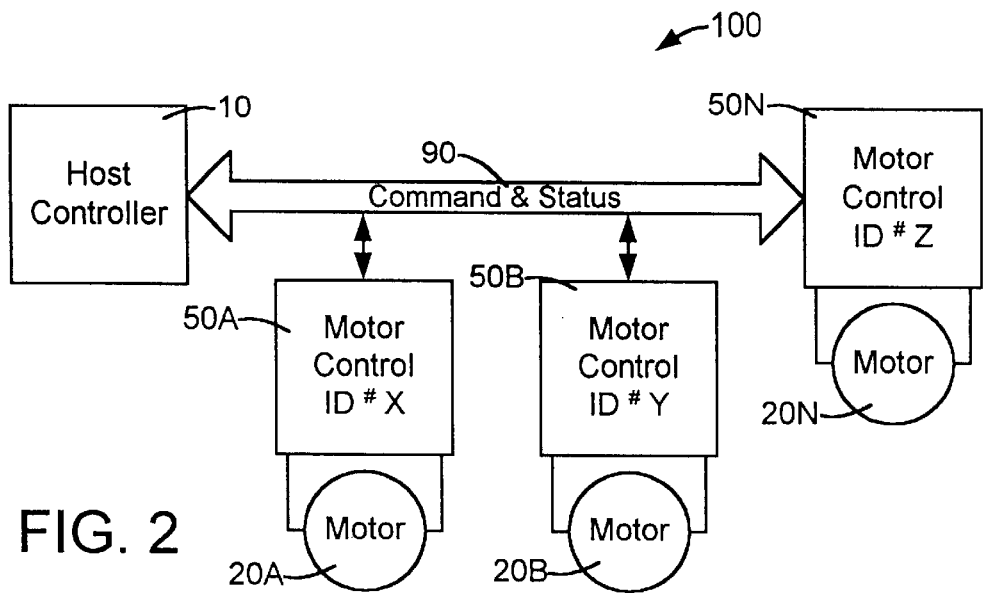
FIG. 2 illustrates a motor system with multiple motors arranged with a parallel topology in accordance with an aspect of the invention.

A system in accordance with the invention having multiple motors can employ a parallel topology, with each motor having a pre-assigned motor address; i.e. each motor can be wired or programmed for a different motor address. The routing of the bus 90 will be relatively simple. FIG. 2 illustrates a motor system 100 with multiple motors 20A–20N arranged with a parallel topology in accordance with an aspect of the invention. The host controller 10 is connected on the serial bus 90, with each of the motor controllers 50A–50N associated with the motors 50A–50N connected in parallel on the bus. The bus 90 can be a synchronous or asynchronous bus, and can for example be a 3-wire or a 4-wire bus. An incoming command is clocked into all motor controllers, and only the controller with matching address will decode and execute the command. The host can also issue a READ STATUS command, and only the correctly addressed controller will transmit its status. Exemplary status data can include command completed, motor ready, and fault. Another technique for obtaining status data will be described below with respect to FIG. 6, wherein status pins on each motor controller are OR tied, and only the correctly addressed controller will drive this status pin to the appropriate voltage level.

Figure 3:
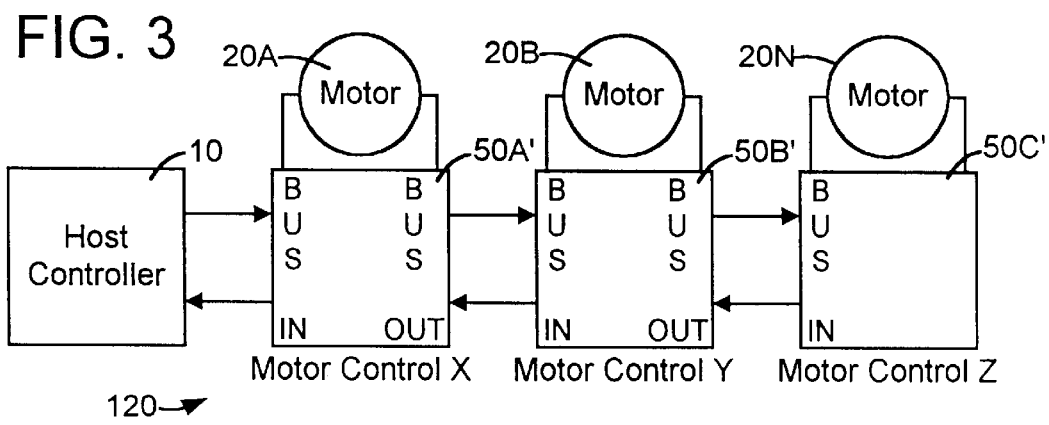
FIG. 3 is a schematic diagram of a cascaded, daisy chained motor system.

Alternatively, the motors in a multiple motor system can be connected in a daisy chain or cascaded manner. A cascaded multiple motor system 120 is shown in FIG. 3. In this exemplary cascaded topology, each motor has BUS_IN and BUS_OUT ports or terminals. The first motor 50A' in the chain is assigned motor address 1 at the motor system power-up. The first motor communicates to the next motor 50B' in the cascaded chain that its address is 1. This next motor (50B') will automatically assign itself as motor address 2 and in turn indicate this to the next motor. Subsequently, each the motors in the cascaded chain through 50N' will self assign its address number or designation.

When a command with an address designation is communicated over the BUS 90, it is received by motor controller 50A'. If the first motor controller 50A' determines that the incoming command is for itself, this first motor will store the command and execute the command. If, one the other hand, the first motor 50A' determines that the command is for another motor down the chain, it will retransmit the command through its BUS_OUT terminal to the next motor controller 50B' in the cascaded chain, and so on. Status data can be communicated over the bus 90, through STATUS_IN and STATUS_OUT terminals.

Figure 4:
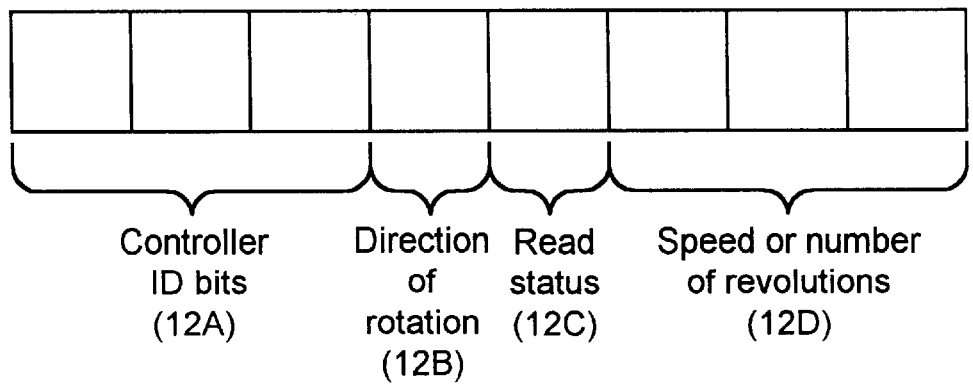
FIG. 4 illustrates an exemplary control word transmitted over the bus from the host controller to the motor controller.

FIG. 4 illustrates an exemplary control word 12 transmitted over the bus 90, which can be used for both embodiments, i.e. for the parallel topology and for the cascaded topology. This control word includes a header set of bits 12A which define the destination motor controller address number, and data bits such as bits 12B–12D which control aspects of the motor operation, e.g. the commanded direction of rotation, read status (e.g., if the bit is set to 1, the motor is instructed to send back to the controller its status), the motor speed or number of revolutions. In the parallel topology, each motor controller connected on the bus receives each command, and reads the header to determine whether the command is directed to that motor controller. Only the controller whose motor address is identified in the command header will execute the command. In the cascaded topology, the command word will be passed down the chain until it reaches the motor controller identified in the header, which will then execute the command.

Figure 5:
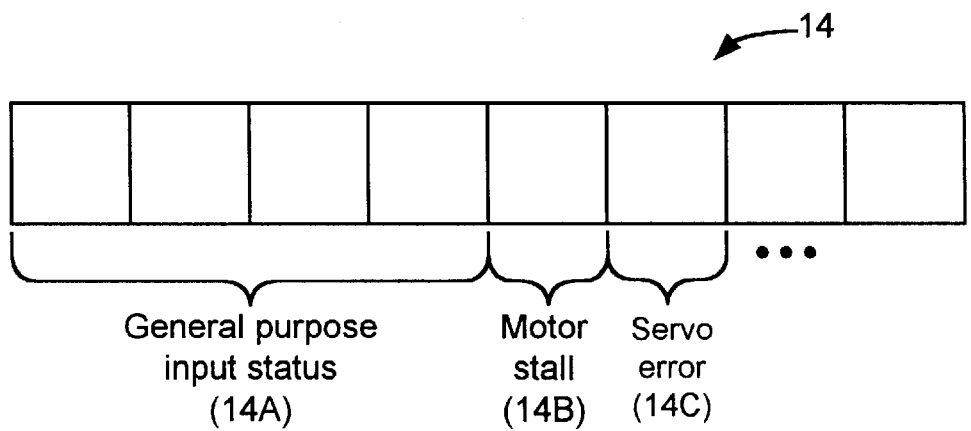
FIG. 5 illustrates an exemplary status word transmitted over the bus from the motor controller to the host controller.

FIG. 5 illustrates an exemplary form of a status word 12 transmitted over the bus from a motor controller 50 to the host controller 10. The status word includes a set of bits 14A for general purpose status, and a number of bits 14B, 14C, . . . , for such status data as motor stall, servo error, and the like. Typically, the status word need not include a motor address identifying the motor sending the status word, since the status word is sent in response to a command to a particular motor. However, the status word could include a motor address, if the status word is sent in response to a global request from the controller, e.g. an inquiry as to whether any motor is stalled.

Figure 6:
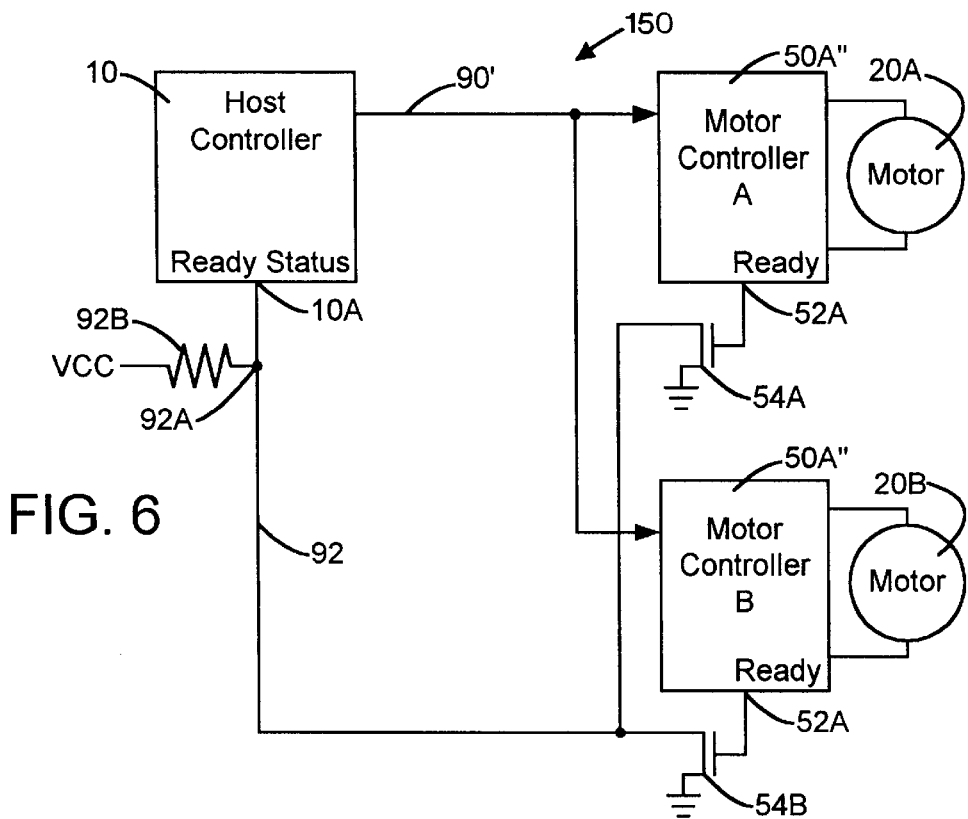
FIG. 6 shows an alternate embodiment of a motor control system in accordance with an aspect of the invention.

FIG. 6 shows a further alternate embodiment of a motor control system 150 in accordance with an aspect of the invention. The system 150 is somewhat simplified in relation to the systems of FIGS. 2 and 3. Like the system 100, the motor controllers are connected in parallel on the control bus 90'. Instead of using a status bus to communicate back the status of each motor control circuit to the host controller 10, this embodiment employs a status line 92, connected to VCC at node 92A through a pull-up resistor 92B. The host controller 10 has a READY status port 10A, which reads the state of the status line. Each motor control circuit, e.g. circuits 50A" and 50B", includes a READY terminal 52A, 52B. The ready terminals are respectively connected to the gates of FET switch transistors 54A, 54B. The sources of the transistors are each connected to the status line 92, and the drains to ground. Of course, the transistors could be bipolar devices, or implemented in an ASIC. By an appropriate control signal applied to the respective READY terminal of the circuit 50A" or 50B" upon completion of the commanded task, the potential on the status line can be pulled down to indicate completion of the commanded task.

Figure 7:
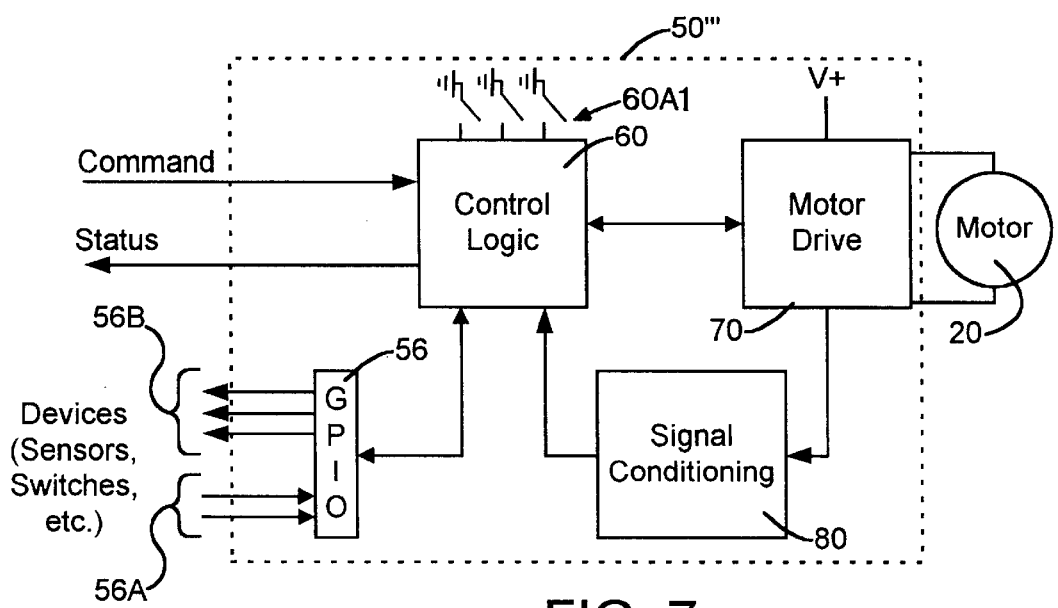
FIG. 7 is a schematic diagram of an alternate embodiment of a motor controller including a general purpose input/output (I/O) port.

In most applications, there will be sensors, limit switches or transducers associated with each motor. In some applications, there may also be other controllable devices associated with or positioned near a motor, such as a solenoid, an indicator light, a sound transducer or the like. It would be desirable to be able to inquire the status of those associated devices, or to control such a device even though it is not directed connected on the bus. To further reduce system complexity, a general purpose input/output (I/O) port can be included in each motor control circuit. This is illustrated in FIG. 7, which shows a motor controller circuit 50''' which includes a control logic 60, motor driver circuit 60 and signal conditioning circuitry 80 as in the circuit 50 of FIG. 1. The circuit 50''' further includes a general purpose I/O (GPIO) port 56 which is coupled to the control logic 60. This GPIO port can be used to communicate with other devices, such as sensors, switches, transducers or other devices associated with the motor 20 or positioned nearby. The port 56 includes input lines 56A and output lines 56B, which allow data to be communicated from the motor device to the control logic 60, or from the control logic 60 to the motor device.

Figure 8B:
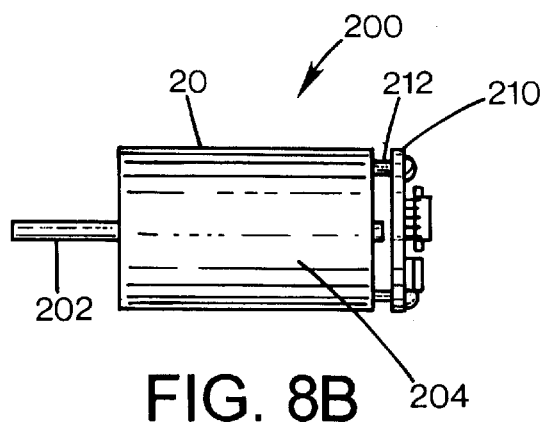
FIG. 8B is a side view of the integrated motor/motor controller.
Figure 8C:
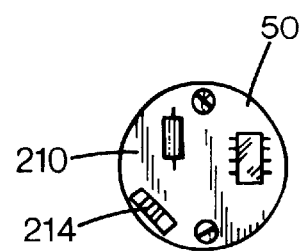
FIG. 8C is an end view of the integrated motor/motor controller.
Figure 8A:
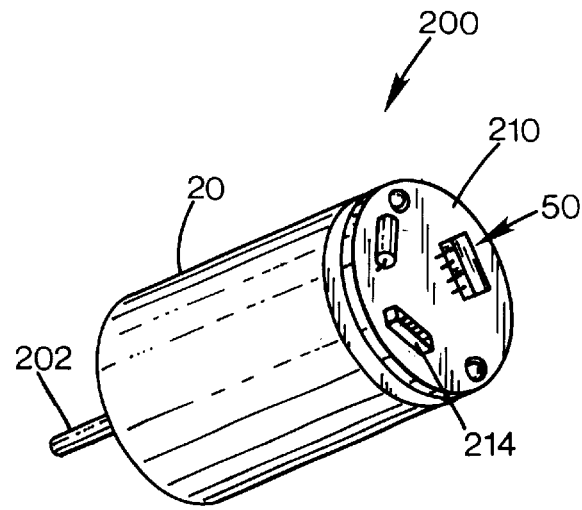
FIG. 8A is an isometric view of an integrated motor/motor controller embodying an aspect of the invention.

In accordance with a further aspect of the invention, the controller 50 can be mounted directly on the motor 20, to provide an integrated motor/motor controller, forming an addressable motor, which can reduce cost and increase reliability. An exemplary embodiment of an addressable motor 200 with integrated motor controller 50 is illustrated in FIGS. 8A–8C. The motor includes a motor shaft 202, and a controller mounting plate 210 mounted to one end of the motor housing 204 by standoff fasteners 212. The plate 210 carries the motor controller 50, and a series connector 214 for connecting to the serial bus (such as bus 90 in FIG. 1).

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A motor control system for controlling a plurality of electric motors, comprising:
   a motor control serial data bus for carrying motor commands words in serial form;
   a plurality of motor circuits, each motor circuit connected in parallel on the motor control bus, each motor circuit including an electric motor and a motor controller circuit, each motor controller circuit including a control logic circuit responsive to command words addressed to the motor controller for generating motor drive control signals, the control logic circuit having an associated motor identification, each command word having associated therewith a motor identification portion and a motor command portion, the control logic including circuitry for converting the motor command portion into said motor driver control signals if said motor identification portion corresponds to the motor identification, a closed loop motor control circuit for controlling the motor in accordance with said motor command words, and wherein said control logic circuit and said closed loop motor control circuit are integrated on a single integrated circuit chip.

2. The system of claim 1, wherein the plurality of motor controllers are connected in a parallel configuration on the bus.

3. The system of claim 1, wherein the plurality of motor controllers are connected in a cascaded configuration on the bus, and each controller includes a bus input terminal and a bus output terminal.

4. The system of claim 1, wherein the closed loop motor control circuit is responsive to a motor position indicating signal indicative of a position of a motor shaft.

5. The system of claim 1, wherein each electric motor is a direct current motor including at least one imbalanced winding, and the closed loop motor control circuit is responsive to a motor position indicating signal indicative of the position of the shaft.

6. The system of claim 1 wherein the motor driver circuit is further integrated on said single integrated circuit chip.

7. An addressable electric motor system, comprising:

an electric motor including a motor housing and a motor shaft, the motor responsive to motor drive signals to rotationally drive the motor shaft;

a motor controller circuit for controlling the electric motor in response to motor commands received on a motor control bus from a host controller, the motor commands in the form of serial data words comprising a plurality of data bits, the motor controller circuit comprising:

a motor driver circuit for providing motor driver signals to the motor in response to motor driver commands; and a control logic circuit responsive to command words from the host controller for generating motor drive control signals, the control logic circuit having an associated motor identification, each command word having associated therewith a motor identification portion and a motor command portion, the control logic including circuitry for converting the motor command portion into said motor driver control signals if said motor identification portion corresponds to the motor identification; and a closed loop motor control circuit for controlling the motor in accordance with said motor command words;

and wherein said control logic circuit and said closed loop motor control circuit are integrated on a single integrated circuit chip.

8. The system of claim 7, further comprising a mounting plate attached to the motor housing, and wherein the motor controller circuit is mounted to the mounting plate.

9. The system of claim 8, wherein the motor controller circuit further comprises a serial connector for connection to a serial data bus carrying said motor commands.

10. The system of claim 7, wherein the motor controller circuit further comprises a serial connector for connection to a serial data bus carrying said motor commands.

11. The system of claim 7, wherein the controller circuit further comprises:

a closed loop motor control circuit for controlling the motor in accordance with said motor command words.

12. The system of claim 11, wherein the electric motor is a direct current motor including at least one imbalanced winding, and the closed loop motor control circuit is responsive to a motor position indicating signal indicative of the position of a motor shaft.

13. The system of claim 12, wherein the closed loop motor control circuit is responsive to a motor position indicating signal indicative of a position of a motor shaft.

14. The system of claim 7 wherein the motor driver circuit is further integrated on said single integrated circuit chip.

15. A motor control system for controlling a plurality of electric motors, comprising:

a serial data bus for carrying motor commands words in serial form;

a plurality of motor circuits, each including an electric motor and a motor controller circuit, each motor controller circuit including a control logic circuit responsive to command words addressed to the motor controller for generating motor drive control signals, the control logic circuit having an associated motor identification, each command word having associated therewith a motor identification portion and a motor command portion, the control logic including circuitry for converting the motor command portion into said motor driver control signals if said motor identification portion corresponds to the motor identification; and wherein the plurality of motor controllers are connected in a cascaded configuration on the bus, and each controller includes a bus input terminal and a bus output terminal.

16. A motor controller circuit for controlling an electric motor in response to motor commands from a host controller provided on a motor control bus, the motor commands in the form of serial data words comprising a plurality of data bits, the motor controller circuit comprising:

a motor driver circuit for providing motor driver signals to the motor in response to motor driver commands;

a control logic circuit responsive to command words received on the motor control bus from the host controller for generating motor drive control signals, the control logic circuit having an associated motor identification, each command word having associated therewith a motor identification portion and a motor command portion, the control logic including circuitry for converting the motor command portion into said motor driver control signals if said motor identification portion corresponds to the motor identification; and a closed loop motor control circuit for controlling the motor in accordance with said motor command words;

and wherein said control logic circuit and said closed loop motor control circuit are integrated on a single integrated circuit chip.

17. The motor controller circuit of claim 16, further including a serial data port for receiving said command words in serial form.

18. The motor controller circuit of claim 17, wherein the control logic further includes a status data communicating circuit coupled to the serial data port for providing motor status data at the serial data port.

19. The motor controller circuit of claim 16, further comprising a general purpose input/output circuit for interfacing other devices to said host controller.

20. The motor controller circuit of claim 16, wherein the electric motor is a direct current motor including at least one imbalanced winding, and the closed loop motor control circuit is responsive to a motor position indicating signal indicative of the position of a motor shaft.

21. The motor controller circuit of claim 16, wherein the closed loop motor control circuit is responsive to a motor position indicating signal indicative of a position of a motor shaft.

22. The circuit of claim 16 wherein the motor driver circuit is further integrated on said single integrated circuit chip.

23. A method for controlling a network of electric motors, each having a corresponding motor controller associated therewith, comprising:

connecting each of the motor controllers in a series, daisy-chained configuration on a serial data bus;

assigning each of the motors a unique motor designation;

sending serial motor drive commands over the data bus, wherein each motor command includes a motor designation corresponding to that particular motor which is to execute the command;

processing the motor command to determine the particular motor to which the motor command is addressed; and driving the particular motor drive signals in accordance with the motor drive command.

24. The method of claim 23, wherein said step of processing the motor command includes reading each motor drive command at each motor controller, and determining whether the motor drive command is addressed to each of said motors.

25. The method of claim 24, wherein the step of determining whether the motor drive command is addressed to each of said motors includes comparing the motor designation associated with the motor drive command to the motor designation for each motor, and determining that the drive command is addressed to a motor only if the command designation corresponds to the motor designation.

26. The method of claim 23, wherein the motor command word is passed down the chain of motor controllers from motor controller to motor controller until reaching the motor controller corresponding to the motor designation associated with the motor drive command.

27. The method of claim 23, further comprising:

reporting the status of one or more of the motors to a host controller.

28. The method of claim 27 wherein the step of reporting the status includes reporting the completion of a command.

29. The method of claim 27 wherein the step of reporting the status includes sending a serial status data word over a serial status bus to the host controller.

30. The method of claim 27, wherein each motor controller includes a status terminal, and wherein the step of reporting status includes reading the state of the status terminal.

* * * * *

UNITED STATES PATENT AND TRADEMARK OFFICE
CERTIFICATE OF CORRECTION

PATENT NO. : 6,653,810 B2  Page 1 of 1
APPLICATION NO. : 09/759741
DATED : November 25, 2003
INVENTOR(S) : Lo It is certified that error appears in the above-identified patent and that said Letters Patent is hereby corrected as shown below:

In The Claims

Col. 7 (line 39), delete claim 9 in its entirety and replace it with the following claim 9:

--9. The system of claim 7, wherein the controller circuit further comprises: a general purpose input/output circuit for interfacing other devices to said host controller.--

Signed and Sealed this

Second Day of October, 2007

JON W. DUDAS
*Director of the United States Patent and Trademark Office*